United States Patent
Mossoba et al.

(10) Patent No.: US 12,254,117 B2
(45) Date of Patent: Mar. 18, 2025

(54) OBFUSCATING COMMUNICATIONS THAT INCLUDE SENSITIVE INFORMATION BASED ON CONTEXT OF THE COMMUNICATIONS

(71) Applicant: Capital One Services, LLC, McLean, VA (US)

(72) Inventors: Michael Mossoba, Great Falls, VA (US); Zoe Fisch, Arlington, VA (US); Timur Sherif, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 324 days.

(21) Appl. No.: 17/650,315

(22) Filed: Feb. 8, 2022

(65) Prior Publication Data

US 2023/0252190 A1 Aug. 10, 2023

(51) Int. Cl.
*G06F 21/62* (2013.01)
*H04L 9/40* (2022.01)

(52) U.S. Cl.
CPC ...... *G06F 21/6263* (2013.01); *H04L 63/1433* (2013.01)

(58) Field of Classification Search
CPC .......................... G06F 21/6263; H04L 63/1433
See application file for complete search history.

(56) References Cited

U.S. PATENT DOCUMENTS

| | | | |
|---|---|---|---|
| 6,687,669 B1* | 2/2004 | Schrogmeier | G10L 21/0208 704/226 |
| 8,464,352 B2 | 6/2013 | Toomey | |
| 8,565,396 B1 | 10/2013 | Oliver | |
| 9,917,817 B1* | 3/2018 | Lad | H04L 63/105 |
| 10,250,939 B2* | 4/2019 | Tegreene | H04N 21/4402 |
| 11,463,582 B1* | 10/2022 | Serban | G06N 20/00 |
| 2013/0170662 A1* | 7/2013 | Koga | G10K 11/002 381/73.1 |
| 2015/0256930 A1* | 9/2015 | Yamakawa | H04K 3/43 704/205 |
| 2018/0241647 A1* | 8/2018 | Baracaldo Angel | H04L 63/1416 |
| 2021/0157950 A1* | 5/2021 | Turano | G06F 21/6245 |
| 2022/0078194 A1* | 3/2022 | Grover | H04L 63/0457 |

* cited by examiner

*Primary Examiner* — Phy Anh T Vu
(74) *Attorney, Agent, or Firm* — Harrity & Harrity, LLP

(57) ABSTRACT

In some implementations, a user device may detect a communication associated with the user device and a user. The user device may analyze, using a machine learning model, a context of the communication to determine a risk score associated with the communication, the risk score indicating a likelihood that the communication is associated with a fraudulent actor attempting to solicit sensitive information from the user. The user device may monitor the communication to identify a trigger in the communication that indicates that sensitive information is to be shared, wherein monitoring the communication includes performing one or more operations to secure the communication based on the risk score satisfying one or more thresholds. The user device may detect, based on monitoring the communication, a portion of the communication that includes the sensitive information. The user device may obfuscate the portion of the communication.

20 Claims, 9 Drawing Sheets

OBFUSCATING COMMUNICATIONS THAT INCLUDE SENSITIVE INFORMATION BASED ON CONTEXT OF THE COMMUNICATIONS

BACKGROUND

Communication screening is a process of evaluating characteristics of a communication. Communication screening may involve determining from whom or from where a communication originated. Communication screening may also involve listening to, recording, and/or transcribing a communication. For example, a system may analyze and/or monitor a communication using natural language processing (NLP). NLP is a field of linguistics, computer science, and artificial intelligence associated with the interactions between computers and human language. NLP may enable a computer to understand the contents of communications, including the contextual nuances of the language within the communications. A computer can then accurately extract information and insights contained in the communications as well as categorize and organize the communications.

SUMMARY

Some implementations described herein relate to a system for obfuscating communications that include sensitive information, based on contexts of the communications. The system may include one or more memories and one or more processors coupled to the one or more memories. The one or more processors may be configured to monitor an incoming communication, from a device and to a user device, associated with a user. The one or more processors may be configured to determine, using a risk model, a risk score associated with a context of the incoming communication, wherein the risk score indicates a likelihood that the incoming communication is associated with a fraudulent actor attempting to solicit sensitive information from the user, and wherein the risk score is based on a first content of the incoming communication, a second content of an outgoing communication that is in response to the incoming communication, and metadata associated with the incoming communication or the device. The one or more processors may be configured to monitor the outgoing communication, from the user device, for personally identifiable information (PII), wherein monitoring the outgoing communication includes performing one or more operations to secure the outgoing communication, and wherein the one or more operations are based on the risk score satisfying one or more thresholds. The one or more processors may be configured to detect, based on monitoring the outgoing communication and using natural language processing (NLP), a portion of the outgoing communication that includes the PII. The one or more processors may be configured to obfuscate the portion of the outgoing communication to generate an obfuscated outgoing communication that obfuscates or removes the PII from the outgoing communication. The one or more processors may be configured to transmit, to the device, the obfuscated outgoing communication.

Some implementations described herein relate to a method of obfuscating communications that include sensitive information. The method may include detecting, by a user device, a communication associated with the user device and a user. The method may include analyzing, by the user device and using a machine learning model, a context of the communication to determine a risk score associated with the communication, wherein the risk score indicates a likelihood that the communication is associated with a fraudulent actor attempting to solicit sensitive information from the user, and wherein the risk score is based on a first content of the communication, a second content of another communication that is in response to the communication or that precedes the communication, and metadata associated with the communication or the other communication. The method may include monitoring, by the user device, the communication to identify a trigger in the communication that indicates that sensitive information is to be shared, wherein monitoring the communication includes performing one or more operations to secure the communication, and wherein the one or more operations are based on the risk score satisfying one or more thresholds. The method may include detecting, by the user device and based on monitoring the communication, a portion of the communication that includes the sensitive information. The method may include obfuscating, by the user device, the portion of the communication to generate an obfuscated communication that does not include the sensitive information.

Some implementations described herein relate to a non-transitory computer-readable medium that stores a set of instructions for wireless communication for a user device. The set of instructions, when executed by one or more processors of the user device, may cause the user device to monitor an incoming communication, from a device and to the user device, associated with a user. The set of instructions, when executed by one or more processors of the user device, may cause the user device to determine, using a machine learning model, a risk score associated with a context of the incoming communication, wherein the risk score indicates a likelihood that the incoming communication is associated with a fraudulent request for sensitive information from the user, and wherein the risk score is based on a first content of the incoming communication, a second content of an outgoing communication that is in response to the incoming communication, and metadata associated with the incoming communication or the device. The set of instructions, when executed by one or more processors of the user device, may cause the user device to monitor the outgoing communication, from the user device, for sensitive information, wherein monitoring the outgoing communication includes performing one or more operations to secure the outgoing communication, and wherein the one or more operations are based on the risk score satisfying one or more thresholds. The set of instructions, when executed by one or more processors of the user device, may cause the user device to detect, based on monitoring the outgoing communication and using NLP, a portion of the outgoing communication that includes the sensitive information. The set of instructions, when executed by one or more processors of the user device, may cause the user device to obfuscate the portion of the outgoing communication to generate an obfuscated outgoing communication that includes the sensitive information removed from the outgoing communication. The set of instructions, when executed by one or more processors of the user device, may cause the user device to transmit,to the device, the obfuscated outgoing communication.

DETAILED DESCRIPTION

Figure 1A:
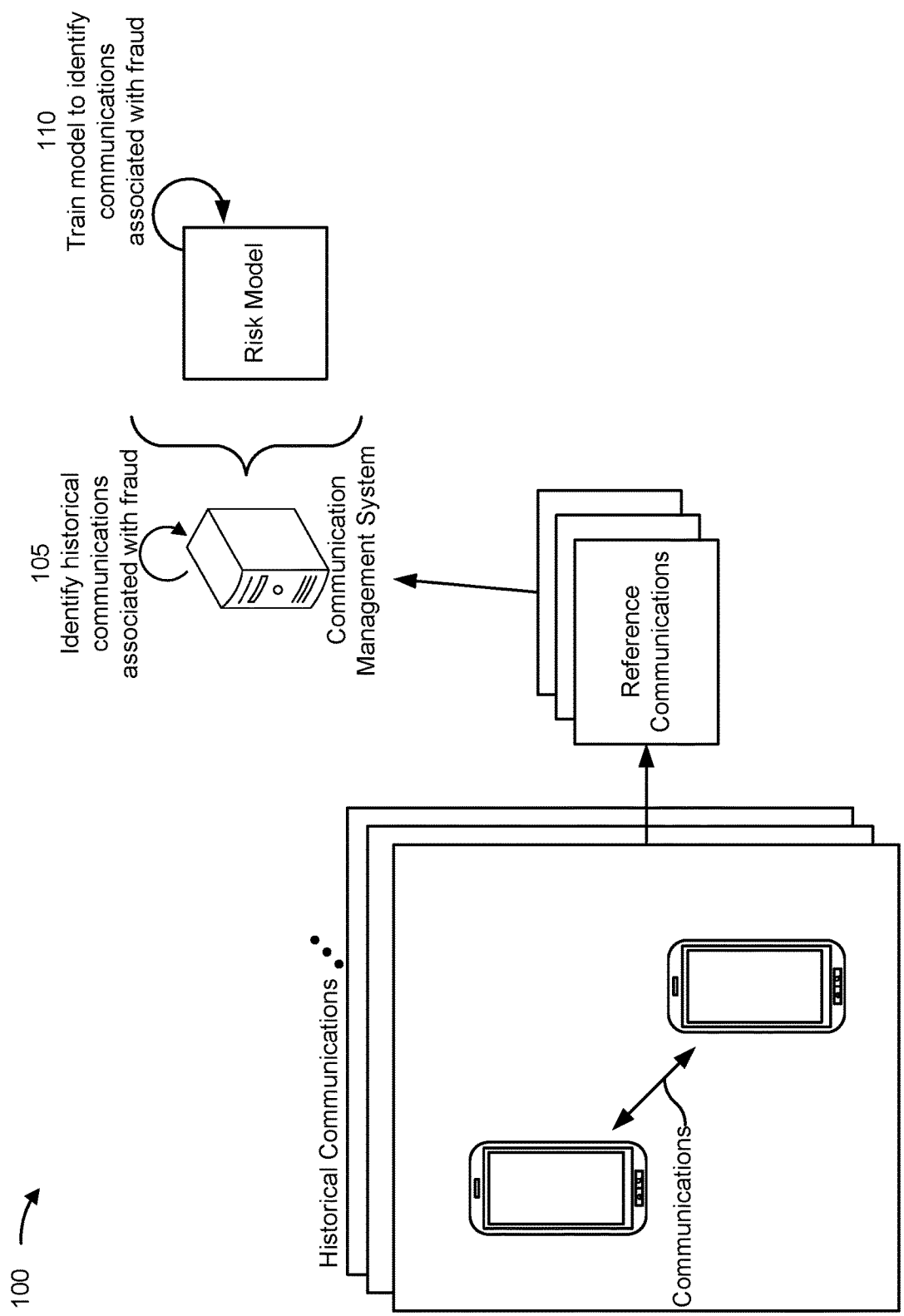
FIGS. 1A-1E are diagrams of an example implementation relating to obfuscating communications that include sensitive information based on a context of the communications.

The following detailed description of example implementations refers to the accompanying drawings. The same reference numbers in different drawings may identify the same or similar elements.

In some cases, a malicious actor may attempt to obtain sensitive information from a user through a series of communications (e.g., a conversation). For example, the malicious actor may attempt to trick or deceive the user into providing sensitive information to the malicious actor. The sensitive information may include personally identifiable information (PII) (e.g., any information that enables an identity of an individual to be inferred or identified through direct or indirect means), confidential information (e.g., a name, a date of birth, and/or a social security number), personal information associated with an account (e.g., answers to personal questions that are asked for security purposes), account information associated with the account (e.g., an account number of the account), identification of the user (e.g., a driver license, a passport, and/or a birth certificate), credit card or debit card information (e.g., a card number, an expiration date of the card, or a security code of the card, such as a card verification value (CVV)), and/or other non-public information. In some examples, the malicious actor may impersonate a trusted party (e.g., a party that the user trusts with sensitive information associated with the user) to cause the user to provide the sensitive information to the malicious actor. For example, the malicious actor may impersonate a trusted family member, a financial institution, a company, and/or a government agency, among other examples.

Such fraudulent schemes performed by malicious actors may be elaborate such that the user is unable to discern the difference between a trusted party and the malicious actor. For example, the fraudulent schemes may involve the malicious actor using contact information (e.g., a phone number, an email address, or other contact information) that appears to be associated with the trusted party, providing information during the conversation that appears to be information that would only be known, or provided, by the trusted party, and/or may format or structure a conversation in a manner that mimics a format or structure of a conversation in which the trusted party would request sensitive information, among other examples. As a result, the user may be deceived into disclosing sensitive information to the malicious actor. The malicious actor may then use the sensitive information to access accounts associated with the user, open accounts associated with the user, steal money from the user, and/or perform other malicious activities using the sensitive information.

In some cases, communication screening may detect when a malicious actor is attempting to fraudulently obtain sensitive information. For example, a system may match trigger words or strings to known words or messages that are associated with a malicious actor attempting to fraudulently obtain sensitive information. However, such systems may use a binary or static approach in which a message or conversation is deemed to either be associated with fraud or not associated with fraud. This may result in a high number of incorrect fraud determinations due to the binary or static approach of the systems. For example, because conversations are often not clearly fraud or clearly not fraud (e.g., due to the sophisticated nature of the fraud schemes) and because the system must classify communications as either fraud or not fraud, there may be a high number of incorrect fraud determinations by the system. Moreover, over time, malicious actors may identify the trigger words or strings used by the system and may avoid including the trigger words or strings in communications, thereby avoiding fraud detection by the system. Further, such systems often block entire responses from a user, resulting in an all-or-nothing approach. For example, if the system detects that a request for sensitive information is fraudulent, the system may block or obfuscate all responses from the user. As a result, the user and/or the system may be unable to determine if the fraud determination was inaccurate (e.g., because responses from the user to the other party are blocked entirely).

Additionally, communications occur in real-time, leaving very little time for a system to process and analyze communications for potential fraud. For example, if a system relies solely on trigger words or strings in a communication to detect fraud and the communication is a voice call, there may be insufficient time for processing and/or analyzing a request, from a malicious actor, for sensitive information between a time when the request is received by the system and a time when a user responds with sensitive information. As a result, the system may be unable to block or obfuscate the response from the user, thereby resulting in a disclosure of sensitive information to a malicious actor due to the insufficient processing time.

Some implementations described herein enable a system to obfuscate communications that include sensitive information, based on contexts of the communications. For example, the system may monitor a conversation associated with a user (e.g., based on receiving permission from the user to monitor the conversation). The conversation may include outgoing communications (e.g., from a user device of the user) and/or incoming communications (e.g., to the user device from another device). The system may determine a risk score for the conversation based on one or more factors. The system may use a machine learning model (e.g., a risk model) to determine the risk score. The risk score may be based on a content of one or more incoming communications, a content of one or more outgoing communications, metadata associated with the incoming communications (e.g., a source identifier, a location identifier, and/or a timing of the incoming communications, among other examples), voice analysis of the incoming communications and/or the outgoing communications, image analysis of the incoming communications and/or the outgoing communications, and/or other factors described in more detail elsewhere herein. The risk score may indicate a likelihood that the incoming communication is associated with a fraudulent actor attempting to solicit sensitive information from the user. The risk score may provide a more dynamic or flexible indication of the likelihood that the incoming communication is associated with a fraudulent actor attempting to solicit sensitive information from the user (e.g., as compared to a binary approach).

Based on the risk score, the system may perform one or more operations to secure an outgoing communication. For example, the one or more operations may be based on the risk score satisfying one or more thresholds. For example, if the risk score satisfies a first threshold, then the system may perform a first set of operations, if the risk score satisfies a second threshold, then the system may perform a second set of operations, and so on. For example, the system may monitor an outgoing communication for sensitive information. The system may detect (e.g., using natural language processing (NLP) and/or another technique) that the outgoing communication includes sensitive information. The system may obfuscate or remove the sensitive information from the outgoing communication. In some implementations, the system may transmit the outgoing communication (e.g., without the sensitive information). As a result, another user may receive the outgoing communication, but may not receive the sensitive information. Therefore, the user and the other user may be enabled to continue the conversation to enable the user to determine if an incorrect fraud determination was made by the system.

Additionally, the system may continually monitor the conversation and update the risk score based on information or content provided during the conversation. This may enable the system to make improved and faster determinations in real-time because the system is continually monitoring the conversation such that the risk score is known prior to a user providing or attempting to transmit an outgoing communication that includes sensitive information. As a result, a processing time associated with obfuscating the sensitive information may be reduced because the system does not need to determine whether there has been a request for sensitive information from a malicious actor, analyze an incoming communication and an outgoing communication, and perform an action to obfuscate or block the outgoing communications. Rather, the system may monitor the outgoing communication(s) for sensitive information and immediately perform an operation to obfuscate any detected sensitive information because the risk score is already determined for the conversation (e.g., and the system knows the operations to be performed based on the risk score). Moreover, the risk score enables the system to not rely solely on predetermined or pre-configured triggers or strings that are associated with fraud, improving a likelihood that the system is able to detect a request for sensitive information from a malicious actor.

FIGS. 1A-1E are diagrams of an example 100 relating to obfuscating communications that include sensitive information based on a context of the communications. As shown in FIGS. 1A-1E, example 100 includes a user device, a malicious device, and a communication management system that may communicate and/or interact with each other to perform operations associated with obfuscating communications that include sensitive information based on contexts of the communications. These devices are described in more detail in connection with FIGS. 3 and 4.

The communication management system may be associated with an application or other service. For example, the communication management system may be associated with an application, operating system, or another program that can be executed on the user device. A user of the user device may download or install the application, operating system, or program associated with the communication management system. The user may sign up for, enroll in, or otherwise register for a fraud monitoring service associated with the communication management system (e.g., as described in more detail elsewhere herein). For example, the user may provide permission for the communication management system to access, monitor, and/or otherwise analyze communications associated with the user device (e.g., the user may provide permission for the communication management system to access and monitor communications to and from the user device). In other words, the communication management system may not monitor and/or analyze communications associated with the user device unless the communication management system receives permission to monitor and/or analyze the communications.

As shown in FIG. 1A, and by reference number 105, the communication management system may identify historical communications to be used to train a risk model (e.g., a machine learning model). The communications may be associated with fraud or may not be associated with fraud. For example, the communication management system may maintain a database of communications that are known to be associated with fraud. As used herein, "communication" may refer to any communication between two devices that is associated with users of the devices, such as an audio communication (e.g., a voice call), a text communication (e.g., a text message or an email), an electronic communication, a communication of an image, and/or any other communication types. As used herein, "sensitive information" may refer to personally identifiable information (PII) (e.g., name, date of birth, address, social security number, mother's maiden name, biometric records, and/or other information that can be used to distinguish or trace an individual's identity), personal data, non-public information, information associated with an account (e.g., an account number, a routing number, an account password, an account security code, and/or other account information), information associated with a transaction card (e.g., a transaction card number, an expiration date, security information associated with the transaction card, a security code of the card, such as a CVV, and/or other information identifying the transaction card), and/or other information linked to an individual (e.g., medical records, educational records, financial records, employment information, and/or other information).

The communication management system may be configured to analyze (e.g., using one or more speech processing techniques, such as a natural language processing technique, a voice recognition technique, a sentiment analysis technique, and/or another technique) reference communications to identify a section of a communication that includes a trigger and a section of audio that includes sensitive information. In some implementations, the communication management system may be configured to analyze reference communications to identify conversations (e.g., a series of communications) that are associated with requests for sensitive information from a malicious actor. In some implementations, the reference communications may be specifically associated with a particular type of sensitive information or set of sensitive information. Correspondingly, the identified triggers may be specifically associated with the particular type of sensitive information or set of sensitive information and/or provide context for a subsequent utterance of the particular type of sensitive information or set of sensitive information.

In some implementations, the reference communications and/or the historical communications may provide a context for conversations that are associated with fraud (e.g., that are associated with requests for sensitive information from a malicious actor). The communication management system may be configured to analyze the reference communications to identify contexts of conversations that are associated with fraud (e.g., that are associated with a request for sensitive information from a malicious actor). For example, the reference communications may indicate typical questions, or a series of questions, that are asked by malicious actors when making requests for sensitive information. As another example, the reference communications may indicate typical manners in which fraudulent actors represent themselves (e.g., a manner in which the fraudulent actor misrepresents their identity), such as a typical indicated source (e.g., "this is your bank," "this is your credit card company," "congratulations I'm from XYZ company and you've won a giveaway," or another indicated source) that is used by malicious actors when making requests for sensitive information.

As another example, the reference communications may include triggers or contexts of outgoing communications (e.g., from a user to a malicious actor) that indicate that sensitive information is included in the outgoing communications. For example, an outgoing communication that indicates an affirmative response to a request for sensitive information may indicate that the outgoing communication will include sensitive information (e.g., in response to a request for sensitive information, the outgoing communication may include words such as "yes," "sure," "let me get that," "no problem," or other affirmative responses indicating that the outgoing communication will provide the requested sensitive information). As another example, a trigger indicating that an outgoing communication may include sensitive information may be an indication associated with a type of sensitive information. For example, "number" may be a trigger word for account numbers, credit card numbers, and/or debit card numbers, among other examples. As another example, "social" may be a trigger word for a social security number. As another example, "expiration date" may be a trigger word for transaction card information.

The communication management system may identify triggers associated with requests for sensitive information (e.g., from malicious actors) and/or triggers associated with responses that include sensitive information. In this way, the communication management system and/or the risk model may learn certain triggers that are typically provided by malicious actors and certain triggers that are typically provided by users. Additionally, or alternatively, a context of a conversation, which may indicate that the conversation is associated with fraud, may include time information associated with a trigger being spoken and/or with sensitive information being provided. For example, the time information may indicate a time during a conversation that the trigger is provided that is relative to a duration of the conversation (or a start of the conversation) and time information for sensitive information may indicate a time relative to the trigger being provided during the conversation.

As shown by reference number 110, the communication management system may train the risk model (e.g., a machine learning model) based on the reference communications and reference sensitive information associated with previous sensitive information provided during the historical communications. In some implementations, the triggers or contexts from the reference communications may be obtained according to a supervised learning technique. For example, a trigger and sensitive information can be marked (e.g., using timestamps for the trigger and timestamps for the sensitive information) in a reference communication. In this way, using the supervised learning technique, the risk model may extract the trigger and the sensitive information from the communication to permit the communication management system (or other system) to train the risk model according to sections of a communication that include the triggers and sections of the communication that include the sensitive information. Additionally, or alternatively, the risk model may utilize an unsupervised learning technique (e.g., using a clustering technique, NLP, and/or another technique). In some implementations, the communication management system may train the risk model according to any suitable technique, such as a random-forest technique, a clustering technique, a neural network technique, a deep learning technique, and/or any other artificial intelligence training technique.

In this way, the risk model may be trained based on reference communications and/or reference trigger data (e.g., data that is representative of learned or identified triggers associated with one or more types of sensitive information or requests for sensitive information from malicious actors) associated with previous triggers used during historical communications. In some implementations, the risk model may be trained according to one or more feature sets (e.g., one or more input parameters). The risk model may be trained to output a risk score associated with a conversation and/or associated with a given communication. The risk score may indicate a likelihood that an incoming communication is associated with a malicious actor (e.g., a fraudulent actor) attempting to solicit sensitive information from the user. Additionally, or alternatively, the risk score may indicate a likelihood that an outgoing communication includes sensitive information in response to a request from a malicious actor. The risk score may be a sliding scale score (e.g., on a scale of 0 to 100, where 0 indicates a lowest likelihood and 100 indicates a highest likelihood). Using the sliding scale score may enable the communication management system to tailor operations, performed by the communication management system and/or a user device, to secure outgoing communications according to an actual risk level of a given conversation (e.g., rather than being constrained to two options of either performing operations or not performing operations to secure the outgoing communications), as explained in more detail elsewhere herein. Training the risk model (e.g., the machine learning model) and using the risk model to determine the risk score is depicted and described in more detail in connection with FIG. 2.

Figure 1B:
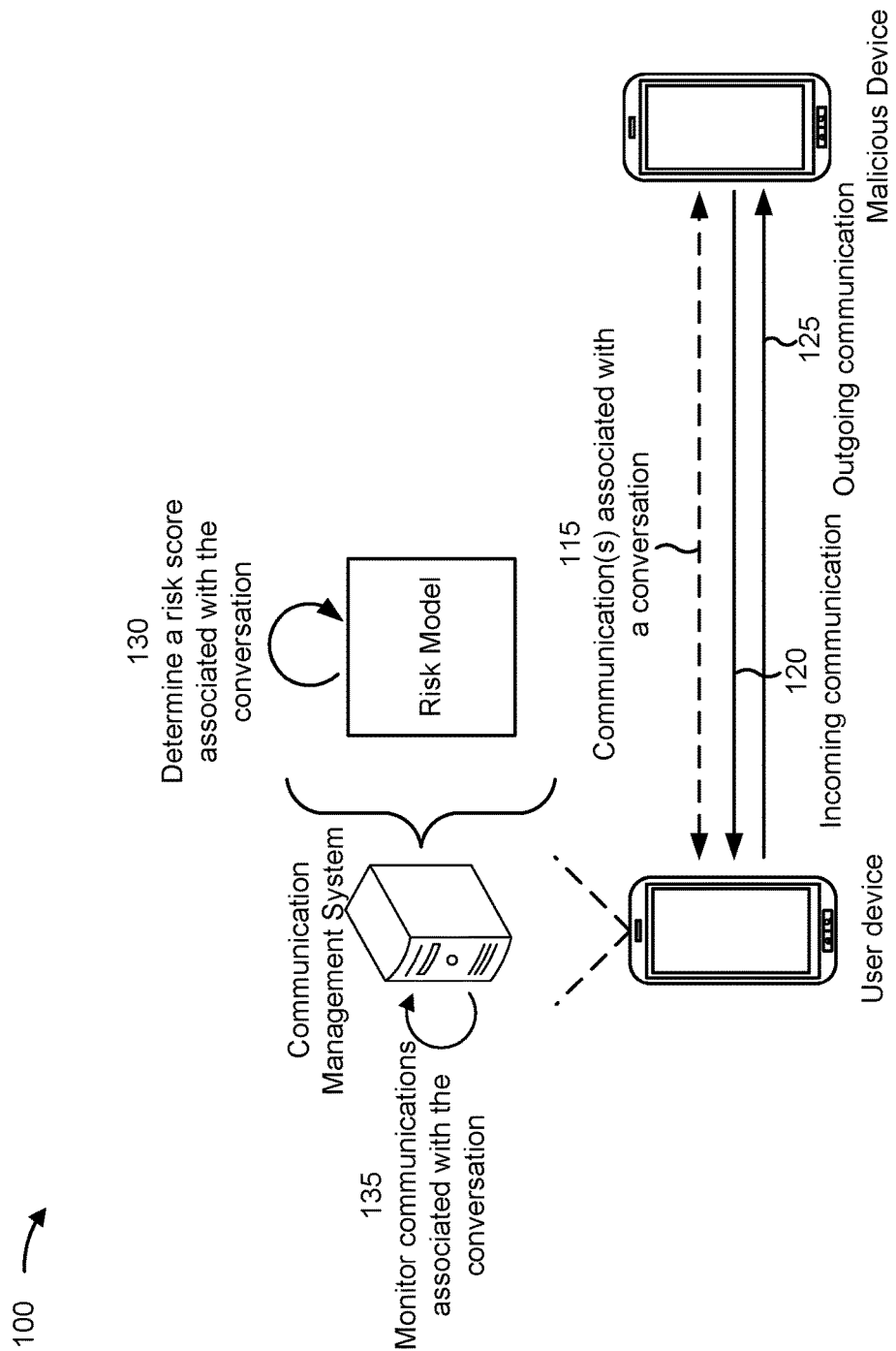

As shown in FIG. 1B, and by reference number 115, the user device and the malicious device (e.g., a device associated with a malicious actor) may transmit and/or receive one or more communications associated with a conversation. For example, in some cases, the malicious device may initiate the conversation with the user device (e.g., the malicious actor may call, text, email, or otherwise contact the user). In another example, the user device may initiate the conversation with the malicious device (e.g., the user may call, text, email, or otherwise contact the malicious actor). The communication(s) shown by reference number 115 may be communications preceding a request, transmitted by the malicious device, for sensitive information and/or preceding a communication, transmitted by the user device, of sensitive information. For example, the communication(s) shown by reference number 115 may not be associated with sensitive information and/or requests for sensitive information. In some implementations, the communication(s) shown by reference number 115 may provide context leading up to a request, from a malicious actor, for sensitive information.

In some implementations, as shown by reference number 120, the malicious device may transmit, and the user device may receive, an incoming communication. In some implementations, the incoming communication may be associated with a request for sensitive information from the user. In some implementations, as shown by reference number 125, the user device may transmit, to the malicious device, an outgoing communication. The outgoing communication may be responsive to the incoming communication. In some implementations, the outgoing communication may include sensitive information associated with the user. The communication(s) shown by reference number 115, the incoming communication shown by reference number 120, and the outgoing communication shown by reference number 125 may be associated with the same conversation (e.g., between the user and the malicious actor).

As shown by reference number 130, the communication management system, via the risk model, may determine a risk score associated with the conversation. As described elsewhere herein, the communication management system may be associated with, or may be included in, the user device. In some implementations, the communication management system may be a system of the user device (e.g., may be included in one or more components of the user device). Alternatively, the communication management system may be separate from the user device (e.g., may be a cloud-based system and/or may be a system separate from the user device). The communication management system, via the risk model, may determine the risk score associated with the conversation based on a first content of the incoming communication, a second content of the outgoing communication, and/or metadata associated with the incoming communication or the malicious device. In other words, the communication management system may analyze a context of the communication or conversation to determine a risk score associated with the communication or conversation.

"Metadata" associated with the incoming communication or the malicious device may refer to information that describes or identifies the incoming communication or the malicious device. For example, the metadata may include identifying information of the incoming communication or the malicious device, a time or date associated with the incoming communication, a source identifier associated with the malicious device (e.g., a phone number, an email address, or another source identifier), a geographic location associated with the malicious device (e.g., a country code or other information identifying a location of the malicious device), and/or a registered user associated with the malicious device (e.g., a user registered with, or associated with, the source identifier of the malicious device), among other examples.

For example, the communication management system may monitor and/or analyze the communications shown by reference number 115, the incoming communication shown by reference number 120, and/or the outgoing communication shown by reference number 125 to extract content from the communication(s) to be input into the risk model. In some implementations, the communication management system may identify triggers in the communication(s) to be input into the risk model (e.g., triggers indicating a request for sensitive information from a malicious actor and/or triggers indicating that sensitive information is included in a communication). For example, one or more inputs to the risk model may include trigger(s) identified by the communication management system in the communication(s) associated with the conversation. For example, an input to the risk model may include a trigger of "account number," "social security number," "password," "security code," "card number," or another trigger indicating sensitive information or a request for sensitive information.

For example, the communication management system may input content of incoming communication(s) and/or outgoing communication(s) to the risk model. The content may include a particular type of content that is associated with fraud (e.g., associated with accounts, credit cards, identification information, such as a driver license, passport, and/or social security number, or other types of content), a voice biometric, a value included in the incoming communication or the outgoing communication that is associated with fraud (e.g., "please provide the last four of your social security number"), a word included in the incoming communication or the outgoing communication that is associated with fraud (e.g., a trigger word), and/or a series of questions or responses included in the incoming communication or the outgoing communication that are associated with fraud, among other examples.

As another example, a trigger provided as an input to the risk model may be associated with a known scheme, or typical story, associated with requests for sensitive information from malicious actors. For example, malicious actors may use a typical story or scheme to deceive users into providing sensitive information. The communication management system may be configured to identify triggers associated with such stories or schemes and may provide the identified triggers as inputs to the risk model. For example, a scheme may be associated with the malicious actor impersonating a government official and indicating that tax money is owed by the user. A trigger for this scheme may include an indication that the malicious actor is a government official (e.g., "I'm with the internal revenue service (IRS)"), an indication that tax money is owed (e.g., "our records indicate that you owe $500 in back taxes), an indication that the user needs to pay the tax money in order to avoid punishment (e.g., "if you do not pay this money, you may face criminal charges"), and/or other triggers associated with the scheme. The communication management system may be trained or configured to identify triggers associated with other fraudulent schemes or stories in a similar manner. In some implementations, the triggers may be included in the one or communications (e.g., shown by reference number 115) preceding the incoming communication and the outgoing communication.

In some implementations, the communication management system may analyze the metadata associated with the malicious device and/or communications transmitted by the malicious device to extract information to be provided as an input to the risk model. For example, the communication management system may identify whether a source identifier (e.g., a phone number, an email address, or another source identifier) associated with the malicious device matches a source identifier in a list of source identifiers that are known to be associated with malicious actors. If the source identifier is included in the list, then the communication management system may provide this indication as an input to the risk model. As another example, the communication management system may identify an indicated source provided by the malicious actor (e.g., in a communication transmitted to the user device). The communication management system may determine whether the indicated source matches a source associated with the malicious device (e.g., a source registered with, or associated with, the malicious device). For example, if a communication transmitted to the user device indicates that the source of the communication is the IRS and a phone number associated with the malicious device is associated with an individual, the communication management system may determine that the indicated source does not match an actual source (e.g., thereby indicating a higher likelihood of fraud). As another example, an email communication may indicate that the source of the email communication is from XYZ company (e.g., that is associated with a domain name of XYZcompany.com). However, the email address associated with the email communication may be associated with another domain name, such as "emailprovider.com." Therefore, the communication management system may determine that the indicated source does not match an actual source. Additionally, the communication management system may use information provided by an internet service provider, or another source, to identify when an email communication is not associated with a source associated with a domain name included in the email address associated with the email communication.

In some implementations, the communication management system may provide biometric information or user profile information as an input to the risk model. For example, the communication management system may maintain user profile information associated with different users. The user profile information may indicate a medium over which a user typically communicates, a tone or style of communications provided by the user, and/or other information identifying a manner in which the user typically communicates. The communication management system may analyze communications provided by the malicious device to identify an indicated source provided by the communications (e.g., "this is John"). The communication management system may determine whether a user profile associated with the indicated source is stored by the communication management system. If the communication management system identifies a user profile associated with the indicated source, then the communication management system may compare information associated with the communication(s) provided by the malicious device to the user profile (e.g., to determine whether the information associated with the communication(s) provided by the malicious device matches the manner in which the user typically communicates). The communication management system may provide comparison information to the user profile as an input to the risk model. As another example, the communication management system may store a voiceprint (e.g., a spectrogram of voice audio from a specific user) associated with a user. The communication management system may determine whether a voiceprint associated with an indicated source, indicated by the malicious actor, is stored by the communication management system. If the communication management system identifies a voiceprint associated with the indicated source, then the communication management system may compare voice biometrics (e.g., audio characteristics, such as a frequency or an amplitude) of the audio included in communications transmitted by the malicious device to the voiceprint (e.g., to determine whether voice biometrics match the voiceprint). The communication management system may provide comparison information to the voiceprint as an input to the risk model.

As another example, the communication management system may identify a geographic location associated with the malicious device. For example, incoming communications, transmitted by the malicious device, may be associated with country codes, such as a country calling code (e.g., in a phone number), or other indications (such as an internet protocol (IP) address associated with the malicious device) that indicate a geographic location of the malicious device. Certain geographic locations may be associated with higher likelihoods of fraud or requests for sensitive information from a malicious actor. Therefore, the communication management system may provide the geographic location of the malicious device as an input to the risk model. Additionally, or alternatively, the communication management system may determine whether the geographic location of the malicious device matches a location indicated in a communication transmitted by the malicious device (e.g., if the communication includes a statement indicating where the malicious actor is located). If the geographic location of the malicious device does not match the location indicated in the communication transmitted by the malicious device, then the communication management system may provide an indication that the locations do not match as an input to the risk model. As another example, the communication management system may determine whether the geographic location of the malicious device matches a location of a source indicated by the malicious actor (e.g., the malicious actor may indicate they are from a certain company or institution that has a geographic location known by the communication management system). If the geographic location of the malicious device does not match the location of the source indicated by the malicious actor, then the communication management system may provide an indication that the locations do not match as an input to the risk model.

In some implementations, the communication management system, via the risk model, may determine a risk score for the conversation after the one or more communications shown by reference number 115, after the incoming communication (e.g., shown by reference number 120) is received by the user device, and/or after the user provides the outgoing communication (e.g., shown by reference number 125), among other examples. In other words, the communication management system, via the risk model, may determine risk scores for the conversation at various points during the conversation. In some implementations, the communication management system, via the risk model, may determine a risk score based on detecting a trigger, as described in more detail elsewhere herein. For example, the communication management system may determine a risk score based on identifying a new input to be provided to the risk model. In other words, the communication management system may update the risk score throughout a conversation (e.g., based on new content provided in communications associated with the conversation).

As shown by reference number 135, the communication management system may monitor communications associated with the conversation. In some implementations, the communication management system may monitor communications associated with the conversation based on the risk score. For example, a level of monitoring (e.g., how closely the communication management system monitors the communication(s)) may be based on the risk score. For example, if the risk score satisfies a first threshold, then the communication management system may monitor only incoming communications (e.g., to the user device). If the risk score satisfies a second threshold, then the communication management system may monitor all communications associated with the conversation. For example, the communication management system may monitor the incoming communication(s) and/or the outgoing communication(s) associated with the conversation. In other words, in some implementations, which communications are monitored may be based on the risk score. This may conserve resources associated with monitoring and/or analyzing the communications because the communication management system may be enabled to monitor fewer communications when the risk score indicates a lower likelihood of fraud.

Figure 1C:
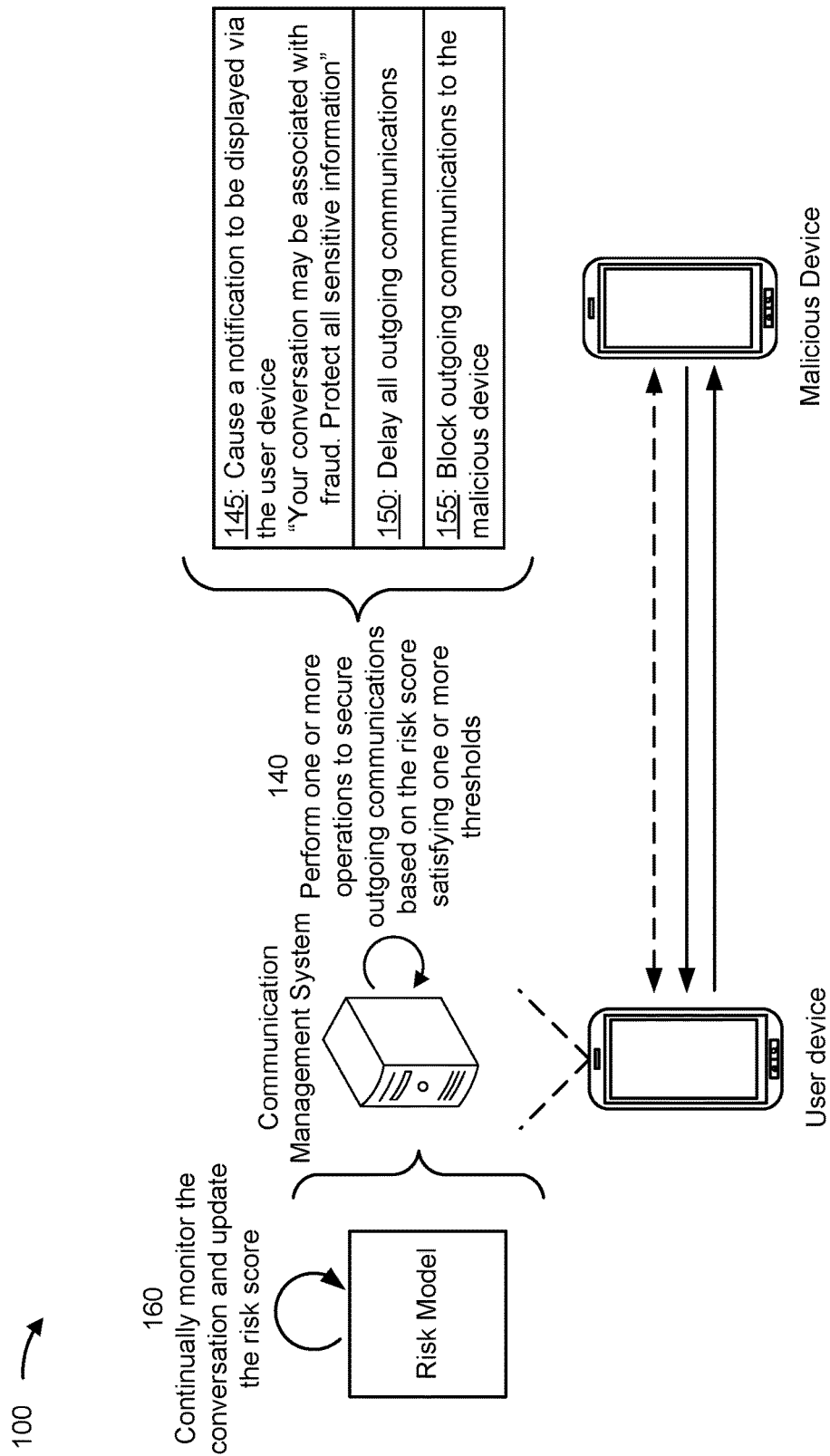

As shown in FIG. 1C, and by reference number 140, the communication management system may perform one or more operations to secure outgoing communications based on the risk score satisfying one or more thresholds. In other words, the communication management system may perform different operations for different risk scores associated with a conversation. For example, if a conversation is associated with a first risk score, then the communication management system may perform a first one or more operations. If a conversation is associated with a second risk score, then the communication management system may perform a second one or more operations. In some implementations, the one or more operations may be associated with a range in which the risk score is included. For example, if the risk score is included in a first range of risk scores, then the communication management system may perform a first one or more operations. If the risk score is included in a second range of risk scores, then the communication management system may perform a second one or more operations. As a result, the operations performed by the communication management system may be more closely tailored to the level of risk associated with the conversation. For example, if a conversation is associated with a lower level of risk (e.g., as indicated by the risk score), then the communication management system may perform less intrusive or less resource consuming operations to secure outgoing communications from disclosing sensitive information. If the conversation is associated with a higher level of risk (e.g., as indicated by the risk score), then the communication management system may perform additional or more intrusive operations to ensure that outgoing communications do not disclose sensitive information associated with the user.

For example, as shown by reference number 145, the one or more operations may include causing a notification to be displayed, by the user device, that indicates that the incoming communication(s) (e.g., the conversation) has a likelihood of being associated with fraud based on the risk score satisfying a first threshold of the one or more thresholds. For example, the communication management system may cause the user device to display (e.g., via a user interface) or output (e.g., via a speaker) an indication that the conversation may be associated with fraud (e.g., "The other party in this conversation may be attempting to fraudulently obtain sensitive information from you. Please proceed with caution."). As another example, as shown by reference number 150, the one or more operations may include delaying any outgoing communications, from the user device (e.g., in response to incoming communication(s)), based on the risk score satisfying a second threshold of the one or more thresholds, to enable the system to process and analyze the outgoing communications. For example, monitoring and/or analyzing outgoing communications for sensitive information may be associated with a processing time (e.g., an amount of time that the communication management system takes to monitor and/or analyze communications). Therefore, the communication management system may delay a transmission of any outgoing communications to enable the communication management system to monitor and/or analyze the outgoing communications before the outgoing communications are transmitted.

As another example, as shown by reference number 155, the one or more operations may include blocking incoming communications (e.g., future incoming communications) from the malicious device based on the risk score satisfying a third threshold of the one or more thresholds. For example, the communication management system may automatically block communications from the malicious device based on the risk score satisfying the third threshold. In some implementations, the one or more operations may include automatically ending the conversation based on the risk score satisfying a fourth threshold of the one or more thresholds.

For example, the communication management system may automatically end a conversation (e.g., may cause a phone call to be dropped or ended) based on the risk score satisfying the fourth threshold.

As shown by reference number 160, the communication management system may continually (e.g., periodically, constantly, and/or based on detecting a new communication, among other examples) monitor communications between the malicious device and the user device to collect information associated with the communications. The communication management system may update the risk score based on providing the information associated with the communications as an input to the risk model. For example, the communication management system may continually collect information associated with a conversation (e.g., even after determining that a conversation has a likelihood of being associated with fraud) to enable the communication management system to update the risk score. The communication management system may perform one or more additional operations based on an updated risk score. For example, if the updated risk score indicates a higher likelihood that the conversation is associated with fraud (e.g., if the updated risk score satisfies a threshold that was not satisfied by a previous risk score), then the communication management system may perform additional operations to secure outgoing communications from including sensitive information. Alternatively, the communication management system may cease a performance of, or refrain from performing, one or more operations based on the updated risk score. For example, if the updated risk score indicates a lower likelihood that the conversation is associated with fraud (e.g., if the updated risk score no longer satisfies a threshold that was satisfied by a previous risk score), then the communication management system may cease a performance of one or more operations (e.g., the communication management system may no longer block communications from the malicious device).

Figure 1D:
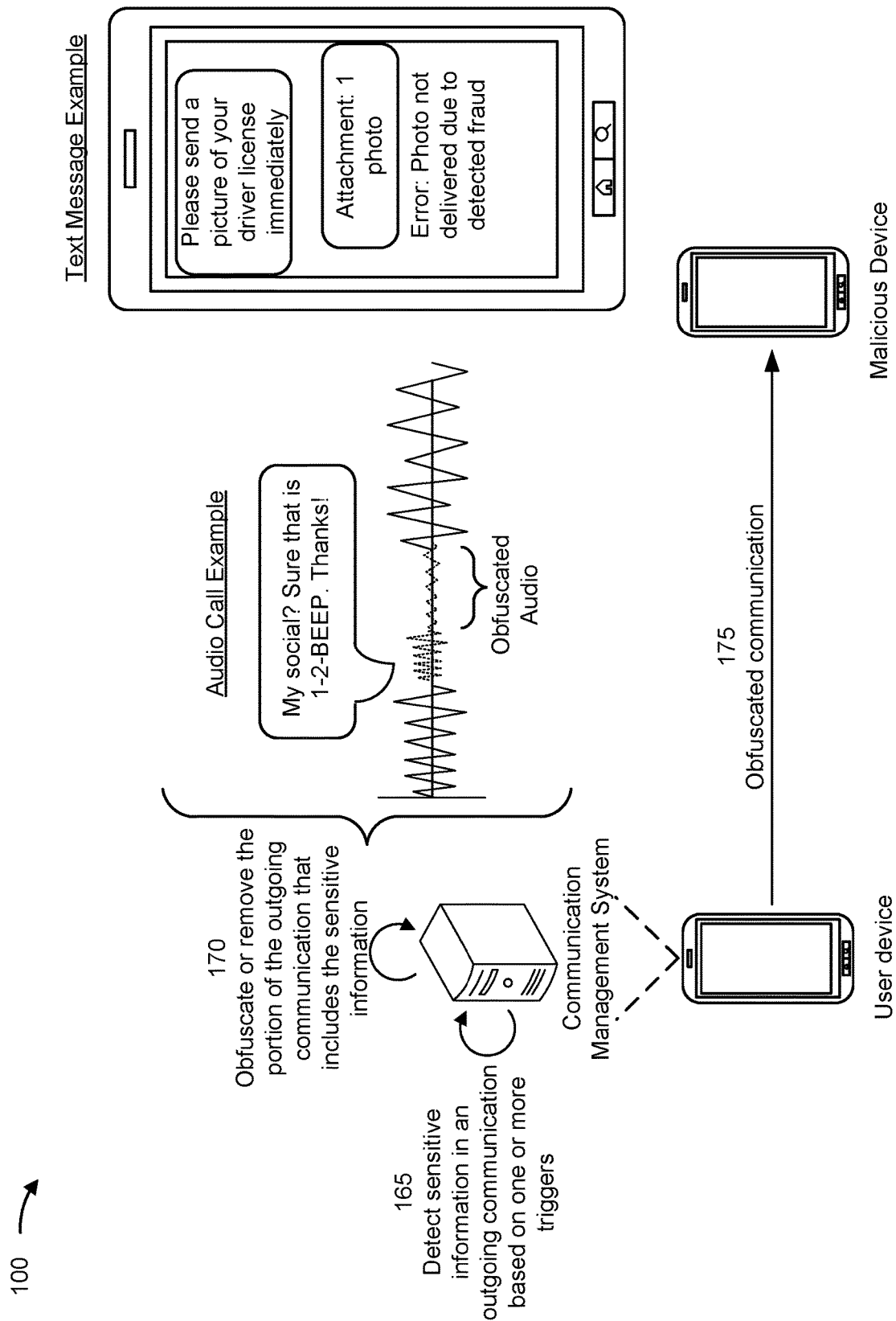

As shown in FIG. 1D, and by reference number 165, the communication management system may detect, based on monitoring the outgoing communication(s) and using NLP or another processing technique, a portion of an outgoing communication that includes the sensitive information. For example, the communication management system may detect the sensitive information based on detecting one or more triggers (e.g., that indicate that sensitive information is included in a communication). For example, the communication management system may be trained (e.g., using the reference communications and/or the historical communications) to identify or detect sensitive information in communications. In some implementations, the communication management system may monitor for a particular type of content included in an outgoing communication that is associated with sensitive information, a value included in the outgoing communication, and/or a word (or phrase) included in the outgoing communication that is associated with sensitive information, among other examples. More specifically, if the type of information is an address of the user (e.g., the trigger indicates that the user is to provide the user's address), the type of content may include speech with words in an address format (e.g., words for street numbers, followed by words for a street, followed by word(s) of a city, followed by word(s) of a state, followed by words for numbers of a zip code, and so on). As another example, if the type of information is a social security number, the communication management system may monitor for numbers in a particular format (e.g., a series of nine numbers, numbers uttered in XXX-XX-XXXX format or sequence, and so on).

As another example, the communication management system may monitor for and/or detect an image that includes or that conveys sensitive information. For example, the image may be of identification of the user (e.g., a driver license, a passport, and/or a birth certificate). As another example, the image may be of a barcode or other code that is machine-readable (e.g., that, when scanned or received by a computer, enables the computer to obtain information). For example, a driver license may include a barcode that, when received and/or processed by a device, conveys sensitive information associated with the user. Therefore, the communication management system may monitor for and/or detect machine-readable images that convey sensitive information associated with a user.

The communication management system may detect a portion or segment of an outgoing communication that includes the sensitive information. For example, the communication management system may identify that the sensitive information is included in a communication after (e.g., directly after or shortly after) a trigger word, phrase, value, and/or image.

As shown by reference number 170, the communication management system may obfuscate or remove the portion of the outgoing communication (e.g., that includes sensitive information) to generate an obfuscated outgoing communication that obfuscates or removes the sensitive information from the outgoing communication. For example, the communication management system may perform one or more operations to generate the obfuscated outgoing communication. In some implementations, the one or more operations may be based on the risk score associated with the conversation (e.g., in a similar manner as described above). In some implementations, the one or more operations may be similar to, or the same as, the one or more operations described above. Additionally, or alternatively, the one or more operations may include refraining from transmitting the portion of the outgoing communication, delaying a transmission of the portion of the outgoing communication until a confirmation that the portion of the outgoing communication is to be transmitted is received (e.g., as explained in more detail in connection with FIG. 1E), replacing the portion of the outgoing communication with a symbol, character, or audio content, removing the portion of the outgoing communication, and/or altering an audio characteristic of the portion of the outgoing communication, among other examples.

For example, FIG. 1D depicts an example associated with an audio (e.g., voice) call communication. In the example shown, the sensitive information may be a social security number. The trigger (e.g., detected by the communication management system) may be the word "social" and/or the affirmative response of "sure that is," among other examples. The communication management system may obfuscate a subsection of a section of an audio stream (e.g., that includes the sensitive information) to prevent the malicious actor from receiving the sensitive information via the audio stream. The communication management system may obfuscate the audio content by altering an audio characteristic of the subsection to prevent the malicious actor from receiving the sensitive information via the audio stream. More specifically, the communication management system may alter an audio frequency or an audio amplitude associated with the section of the outgoing communication that includes the sensitive information.

Additionally, or alternatively, the communication management system may insert audio content into the audio stream to obfuscate the sensitive information. For example, the audio content may be a beep sample, a white noise sample, and/or another sound that prevents the malicious actor from hearing the sensitive information. As shown in FIG. 1D, the audio content may be a beep, such that the obfuscated outgoing communication becomes "My social? Sure that is 1-2-BEEP. Thanks!" As shown, in some implementations, the communication management system may not obfuscate an entire portion of the sensitive information (e.g., the number 1 and 2 may still be included in the obfuscated outgoing communication) due to a processing delay associated with monitoring, analyzing, and/or obfuscating the outgoing communication. However, because a majority, or a section of, the sensitive information is still obfuscated or removed, the malicious actor may not receive sensitive information that enables the malicious actor to perform fraudulent acts using the sensitive information.

The communication management system may obfuscate only the section of the audio that includes the characteristic of the sensitive information that the communication management system is trained to detect. In this way, obfuscating only those portions of the audio in the response that includes the sensitive information can permit the user to continue to communicate with another party before providing the sensitive information, between providing portions of the sensitive information, or after providing the sensitive information. In this way, the user may ask the other party (e.g., the malicious actor) for assistance and/or request the agent to reinstruct the user on what information is to be provided because the other party is not prevented from receiving portions of the response that do not include the sensitive information. For example, in scenarios where the communication management system incorrectly determines that the conversation is associated with a high likelihood of fraud and obfuscates the sensitive information, the user and the other party (e.g., who is not actually a malicious actor) may be enabled to continue to communicate.

FIG. 1D also depicts an example associated with a text message communication. As shown in FIG. 1D, an incoming communication may be "Please send a picture of your driver license immediately." The communication management system (e.g., via the risk model) may determine that the conversation is associated with a risk score that indicates a high likelihood of fraud (e.g., because the malicious device is requesting a picture of the user's driver license, is requesting it immediately, and/or is not associated with a trusted source). The communication management system may detect that the user is attempting to send an image of a driver license. Therefore, the communication management system may refrain from transmitting the image (e.g., due to the risk score associated with the conversation indicating a high likelihood of fraud). In some implementations, the communication management system may cause a notification to be displayed that indicates that the outgoing communication was not transmitted (e.g., "Error: photo not delivered due to detected fraud."). If the outgoing communication were to include a message (e.g., "Here you go!"), the communication management system may enable the message to be transmitted (e.g., so long as no sensitive information is included in the message), but may not deliver the image (e.g., as described above).

As shown by reference number 175, the user device may transmit (e.g., via the communication management system), and the malicious device may receive, the obfuscated outgoing communication. For example, the user device may transmit a partial communication or an altered communication such that the malicious actor does not receive sensitive information that would have otherwise been included in the outgoing communication (e.g., if the outgoing communication were not obfuscated as described above). This may enable the user and the party associated with the malicious device to continue the conversation (e.g., to enable the user to quickly and easily identify cases in which the communication management system incorrectly obfuscated sensitive information due to misidentifying the risk score or misidentifying sensitive information in the outgoing communication). For example, transmitting the obfuscated outgoing communication may enable the party associated with the malicious device to respond indicating that they did not receive the sensitive information. As a result, the user may be prompted to further examine whether the sensitive information should be transmitted to the malicious device. If the user determines that the sensitive information should be transmitted to the malicious device, then the user may override the obfuscation by the communication management system (e.g., as depicted and described in more detail in connection with FIG. 1E). In some other implementations, the user device (e.g., via the communication management system) may not transmit the outgoing communication (e.g., that includes sensitive information).

Figure 1E:
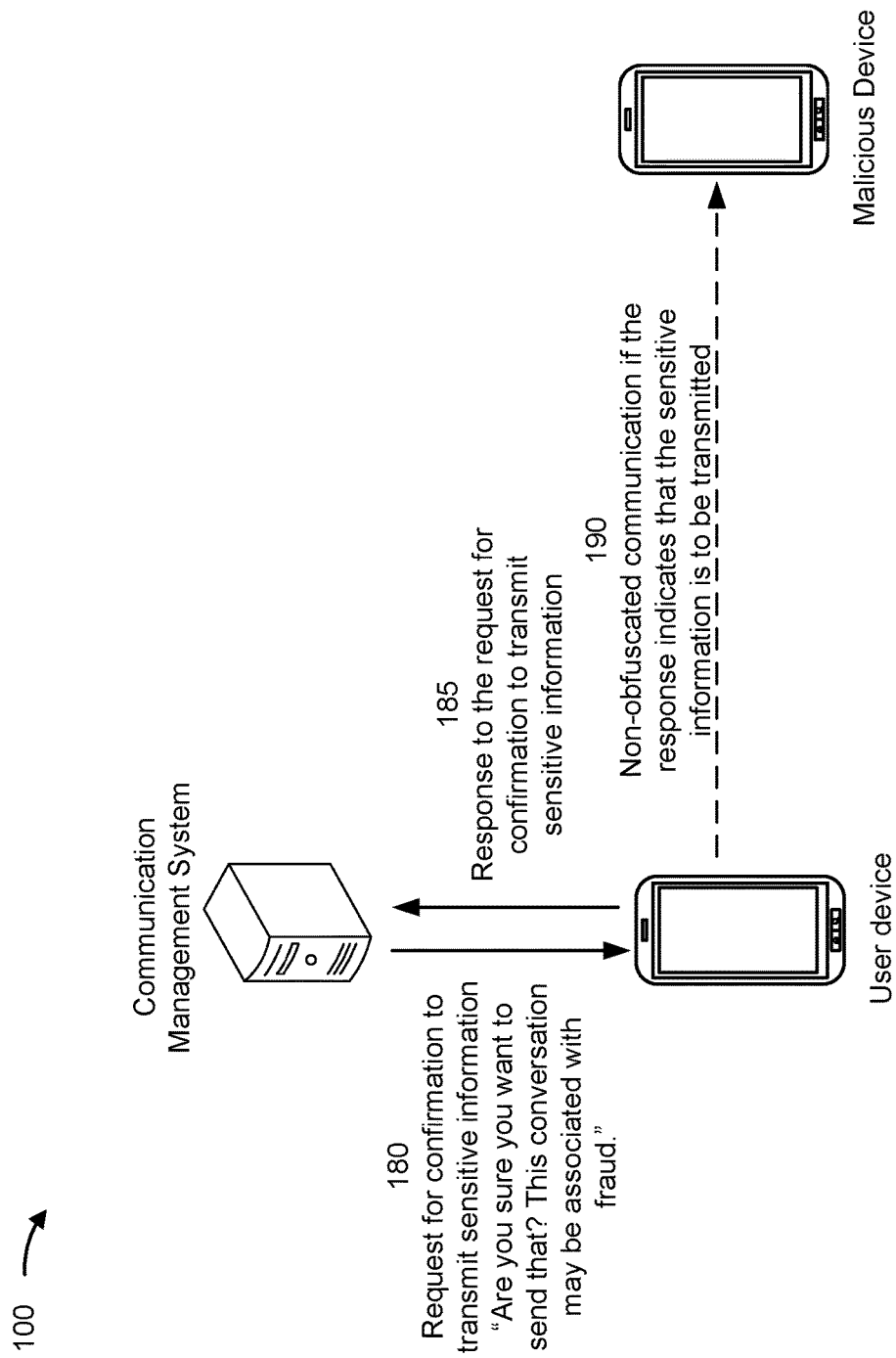

As shown in FIG. 1E, the communication management system and the user device may communicate to confirm whether sensitive information, that the user attempted to transmit in the outgoing communication, should be transmitted. For example, as shown by reference number 180, the communication management system may transmit, and the user device may receive, a request, for a confirmation that the portion of the communication (e.g., that includes sensitive information) is to be transmitted, to be displayed by the user device. For example, the communication management system may cause the request for a confirmation that the portion of the communication is to be transmitted to be displayed by the user device. In some implementations, the request for the confirmation indicates that the communication may be in response to a fraudulent request. For example, the request may be "Are you sure you want to send that? This conversation may be associated with fraud." In some implementations, the request may identify the sensitive information that was obfuscated. For example, the request may be "We did not transmit your social security number. Are you sure you want to send that? This conversation may be associated with fraud."

As a result, the user may be prompted to perform further investigation to determine if the conversation is associated with fraud. The user may provide an input to the user device indicating whether the user wishes to transmit the sensitive information. For example, if the user determines that the conversation is not associated with fraud or that the communication management system misidentified sensitive information, then the user may provide an input to the user device indicating that the portion of the outgoing communication should be transmitted. Alternatively, if the user determines that the conversation may be associated with fraud, then the user may provide an input indicating that the portion of the outgoing communication should not be transmitted. As shown by reference number 185, the user device may transmit, and the communication management system may receive, a response to the request for the confirmation. The response may indicate whether the portion of the outgoing communication that included the sensitive information is to be transmitted.

As shown by reference number 190, the user device (e.g., via the communication management system) may transmit the non-obfuscated communication (e.g., the outgoing communication that was provided to the user device prior to the communication management system performing obfuscating, as described above) if the response indicates that the sensitive information is to be transmitted. For example, the user device may transmit the communication based on the response indicating that the portion of the communication is to be transmitted. Alternatively, the user device (e.g., via the communication management system) may refrain from transmitting the portion of the communication based on the response indicating that the portion of the communication is not to be transmitted. In some implementations, the operations shown by reference numbers 180 and 185 may occur after the communication management system detects sensitive information (e.g., shown by reference number 165 in FIG. 1D) and before the communication management system obfuscates or removes the sensitive information (e.g., shown by reference number 170 in FIG. 1D) (e.g., to conserve resources that would have been otherwise used to obfuscate or remove the sensitive information when the user is overriding the determination made by the communication management system). Alternatively, the operations shown by reference numbers 180 and 185 may occur after the user device transmits the obfuscated communication (e.g., to maintain the real-time nature of the conversation and minimize communication delays).

In some implementations, the communication management system may analyze a conversation for fraud and/or a disclosure of sensitive information after a conversation has been completed. For example, the communication management system may analyze the communication and any preceding or subsequent communications an amount of time after transmitting the communication (e.g., the obfuscated and/or the non-obfuscated communication). The communication management system may determine, via the risk model, that the communication is associated with a request for the sensitive information from a malicious actor (e.g., a fraudulent request). In such examples, the communication management system may cause a notification to be provided, to the user device, that indicates that the communication (e.g., the conversation) may be associated with a fraudulent request for the sensitive information and/or a disclosure of sensitive information to a malicious actor. This may enable the user to perform an action to mitigate the consequence of the disclosure of sensitive information to a malicious actor.

As indicated above, FIGS. 1A-1E are provided as an example. Other examples may differ from what is described with regard to FIGS. 1A-1E.

Figure 2:
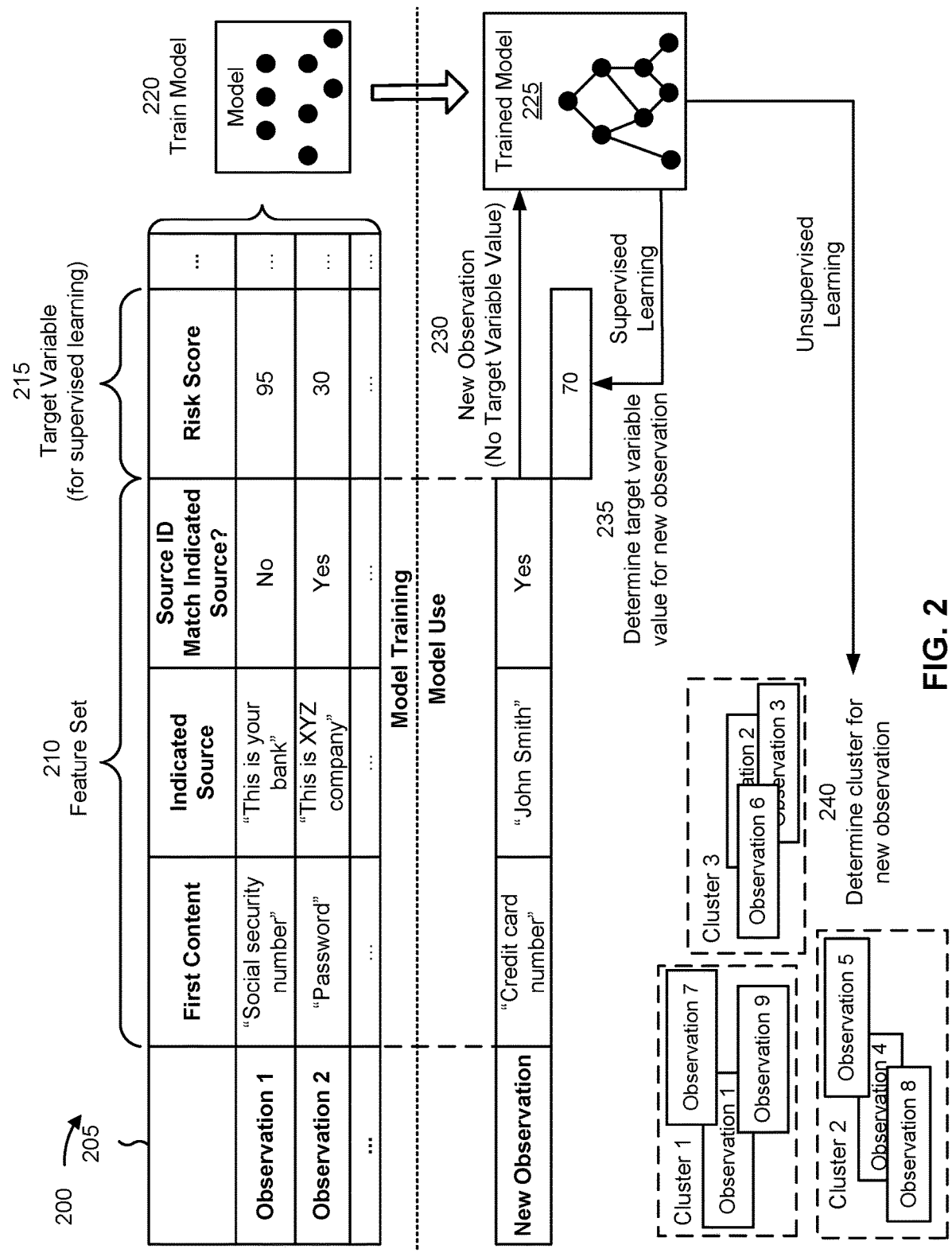
FIG. 2 is a diagram illustrating an example of training and using a machine learning model in connection with obfuscating communications that include sensitive information based on a context of the communications.

FIG. 2 is a diagram illustrating an example 200 of training and using a machine learning model in connection with obfuscating communications that include sensitive information based on a context of the communications. The machine learning model training and usage described herein may be performed using a machine learning system. The machine learning system may include or may be included in a computing device, a server, a cloud computing environment, or the like, such as the user device and/or the communication management system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) via the user device and/or the malicious device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device and/or the malicious device, among other examples. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a first content of a communication, a second feature of an indicated source of the communication, a third feature of whether a source identifier of a communication matches an indicated source, and so on. As shown, for a first observation, the first feature may have a value of "social security number", the second feature may have a value of "this is your bank", the third feature may have a value of "no", and so on. These features and feature values are provided as examples, and may differ in other examples. For example, the feature set may include one or more of the following features: one or more additional contents of an incoming communication or an outgoing communication; geographic location information associated with a device (e.g., the malicious device), whether a user profile of the indicated source matches a stored user profile; whether voice biometrics of an audio call match a stored voiceprint of the indicated source; whether the source identifier is included in a list associated with known malicious actors; a value included in an incoming communication or an outgoing communication; a format of a phrase or number included in an incoming communication or an outgoing communication; whether a series of questions or responses, included in the incoming communication or the outgoing communication, match a known series of questions or responses associated with fraud; and/or whether an incoming communication or an outgoing communication includes a particular type of content that is associated with fraud; among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is the risk score (e.g., indicating a likelihood that a conversation is associated with fraud or a request for sensitive information from a malicious actor), which has a value of 95 for the first observation (for example, on a scale of 0-100, where 100 indicates the highest risk of fraud and 0 indicates the lowest risk of fraud).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of a first content of a communication, a second feature of an indicated source of the communication, a third feature of whether a source identifier of a communication matches an indicated source, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 70 for the target variable of the risk score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, to provide a notification to a user indicating that the user should not provide sensitive information during the conversation, that the conversation is associated with fraud, to monitor the conversation for sensitive information, and/or to obfuscate any sensitive information provided by a user during the conversation, among other examples. The first automated action may include, for example: causing a notification to be displayed, via a user device of a user associated with the conversation, indicating that the conversation may be associated with fraud; obfuscating any detected sensitive information provided by the user during the conversation; and/or blocking any future communications from a source of the conversation (e.g., from a malicious device associated with the conversation); among other examples.

As another example, if the machine learning system were to predict a value of 15 for the target variable of the risk score, then the machine learning system may provide a second (e.g., different) recommendation (e.g., that the conversation is not associated with fraud) and/or may perform or cause performance of a second (e.g., different) automated action (e.g., refraining from monitoring outgoing communications and/or refraining from obfuscating sensitive information in outgoing communications). As another example, if the machine learning system were to predict a value of 95 for the target variable of the risk score, then the machine learning system may provide a third (e.g., different) recommendation (e.g., to end the conversation because the conversation has a high likelihood of being associated with fraud) and/or may perform or cause performance of a third (e.g., different) automated action (e.g., automatically ending a voice call or automatically blocking any incoming or outgoing communications associated with the conversation).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a cluster of conversations associated with risk scores in a first range, such as from 60 to 80), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster of conversations associated with risk scores in a second range, such as from 0 to 20), then the machine learning system may provide the second (e.g., different) recommendation and/or may perform or cause performance of the second (e.g., different) automated action. As another example, if the machine learning system were to classify the new observation in a third cluster (e.g., a cluster of conversations associated with risk scores in a third range, such as from 80 to 100), then the machine learning system may provide the third (e.g., different) recommendation and/or may perform or cause performance of the third (e.g., different) automated action. In some implementations, if the machine learning system were to classify the new observation in the third cluster, then the machine learning system may provide the first and the third recommendations and/or may perform or cause performance of the first and the third automated actions (e.g., because the conversations in the third cluster satisfy thresholds or ranges associated with the first cluster and the third cluster). For example, the first cluster may be associated with a threshold risk score of 60, the second cluster may be associated with a threshold risk score of 0, and the third cluster may be associated with a threshold risk score of 80.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to identify conversations that may be associated with fraud or a likelihood of a request for sensitive information from a malicious actor and to obfuscate communications that include sensitive information based on context of the communications. The machine learning system enables recognition and/or identification of tens, hundreds, thousands, or millions of features and/or feature values for tens, hundreds, thousands, or millions of observations, thereby increasing accuracy and consistency and reducing delay associated with identifying conversations that may be associated with fraud or a likelihood of a request for sensitive information from a malicious actor and to obfuscating communications that include sensitive information based on context of the communications relative to requiring computing resources to be allocated for tens, hundreds, or thousands of operators to manually identify conversations that may be associated with fraud or a likelihood of a request for sensitive information from a malicious actor and to obfuscate communications that include sensitive information based on contexts of the communications using the features or feature values.

As indicated above, FIG. 2 is provided as an example. Other examples may differ from what is described in connection with FIG. 2.

Figure 3:
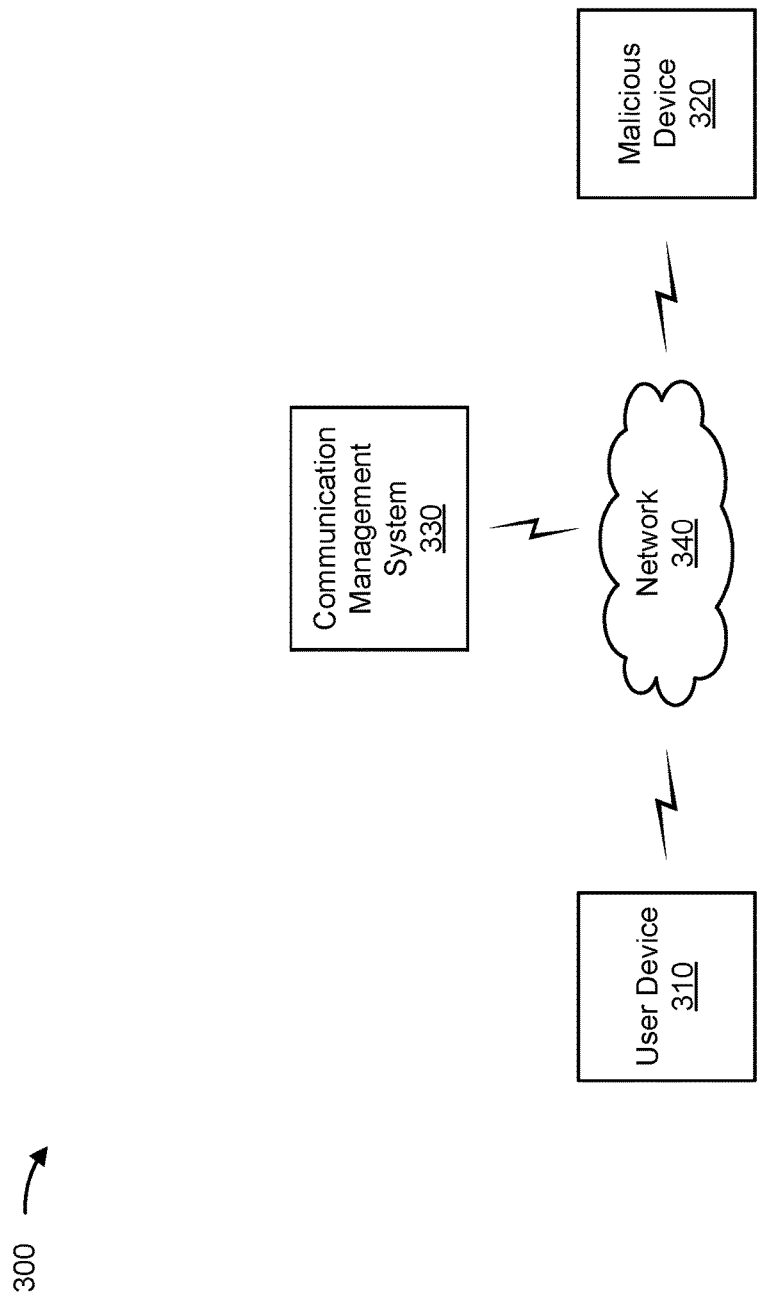
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a malicious device 320, a communication management system 330, and a network 340. Devices of environment 300 may interconnect via wired connections, wireless connections, or a combination of wired and wireless connections.

The user device 310 includes one or more devices capable of receiving, generating, storing, processing, and/or providing information associated with obfuscating communications that include sensitive information based on context of the communications, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The malicious device 320 includes one or more devices capable of receiving, generating, storing, processing, and/or providing information associated with obfuscating communications that include sensitive information based on context of the communications, as described elsewhere herein. The malicious device 320 may include a communication device and/or a computing device. For example, the malicious device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The communication management system 330 includes one or more devices capable of receiving, generating, storing, processing, providing, and/or routing information associated with obfuscating communications that include sensitive information based on context of the communications, as described elsewhere herein. The communication management system 330 may include a communication device and/or a computing device. For example, the communication management system 330 may include a server, such as an application server, a client server, a web server, a database server, a host server, a proxy server, a virtual server (e.g., executing on computing hardware), or a server in a cloud computing system. In some implementations, the communication management system 330 includes computing hardware used in a cloud computing environment. In some implementations, the communication management system 330 may be co-located with, or included in, the user device 310. In some other implementations, the communication management system 330 may be separate from the user device 310. The communication management system 330 may be associated with an application, operating system, or other program executing on the user device 310.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
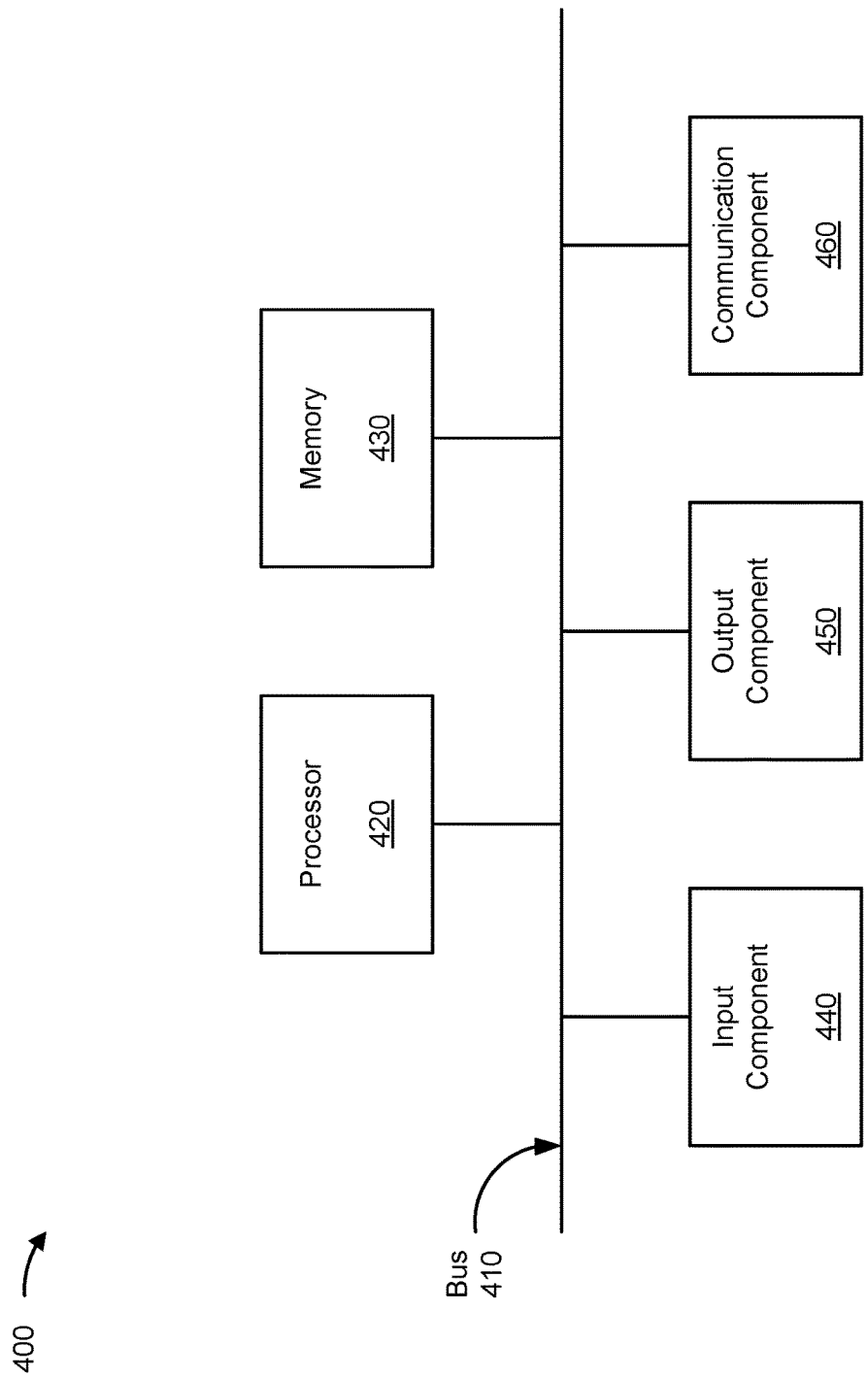
FIG. 4 is a diagram of example components of one or more devices of FIG. 3.

FIG. 4 is a diagram of example components of a device 400, which may correspond to the user device 310, the malicious device 320, and/or the communication management system 330, among other examples. In some implementations, the user device 310, the malicious device 320, and/or the communication management system 330 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
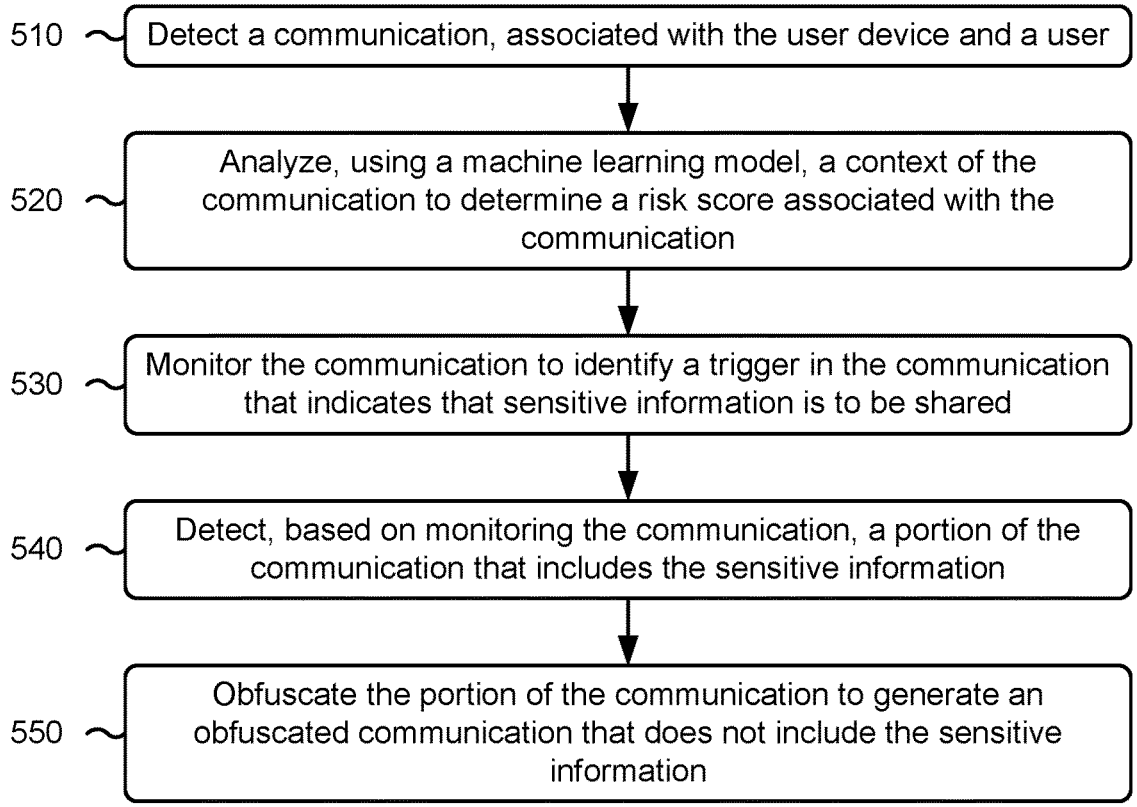
FIG. 5 is a flowchart of an example process relating to obfuscating communications that include sensitive information based on a context of the communications.

FIG. 5 is a flowchart of an example process 500 associated with obfuscating communications that include sensitive information based on a context of the communications. In some implementations, one or more process blocks of FIG. 5 may be performed by a user device (e.g., user device 310) and/or a communication management system (e.g., communication management system 330). In some implementations, one or more process blocks of FIG. 5 may be performed by another device or a group of devices separate from or including the user device, such as the malicious device 320. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include detecting a communication associated with the user device and a user (block 510). As further shown in FIG. 5, process 500 may include analyzing, using a machine learning model, a context of the communication to determine a risk score associated with the communication (block 520). In some implementations, the risk score indicates a likelihood that the communication is associated with a fraudulent actor attempting to solicit sensitive information from the user. In some implementations, the risk score is based on a first content of the communication, a second content of another communication that is in response to the communication or that precedes the communication, and metadata associated with the communication or the other communication. As further shown in FIG. 5, process 500 may include monitoring the communication to identify a trigger in the communication that indicates that sensitive information is to be shared (block 530). In some implementations, monitoring the communication includes performing one or more operations to secure the communication. In some implementations, the one or more operations are based on the risk score satisfying one or more thresholds. As further shown in FIG. 5, process 500 may include detecting, based on monitoring the communication, a portion of the communication that includes the sensitive information (block 540). As further shown in FIG. 5, process 500 may include obfuscating the portion of the communication to generate an obfuscated communication that does not include the sensitive information (block 550). In some implementations, process 500 may include transmitting the obfuscated communication.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for obfuscating communications that include sensitive information based on context of the communications, the system comprising:
   one or more memories; and
   one or more processors, coupled to the one or more memories, configured to:
      monitor an incoming communication, from a device and to a user device, associated with a user;
      determine, using a machine learning model, a risk score associated with a context of the incoming communication, wherein the risk score indicates a likelihood that the incoming communication is associated with a fraudulent actor attempting to solicit sensitive information from the user, and wherein the risk score is based on:
         a first content of the incoming communication,
         a second content of an outgoing communication that is in response to the incoming communication, wherein the incoming communication and the outgoing communication include a voice call occurring in real-time, and
         metadata associated with the incoming communication or the device;
      monitor the outgoing communication, from the user device, for personally identifiable information (PII), wherein monitoring the outgoing communication includes performing one or more operations to secure the outgoing communication, and wherein the one or more operations are based on the risk score satisfying one or more thresholds;
      detect, based on monitoring the outgoing communication and using natural language processing (NLP), a portion of the outgoing communication that includes the PII;

obfuscate the portion of the outgoing communication to generate an obfuscated outgoing communication by altering an audio characteristic of the voice call, wherein altering the audio characteristic comprises modifying an audio frequency of the portion of the outgoing communication to prevent unauthorized access to the PII within the outgoing communication; and transmit, to the device, the obfuscated outgoing communication.

2. The system of claim 1, wherein the one or more processors are further configured to:

train the machine learning model based on reference communications and reference PII associated with previous PII provided during historical communications.

3. The system of claim 1, wherein the risk score is further based on a third content of one or communications preceding the incoming communication and the outgoing communication.

4. The system of claim 1, wherein the one or more operations to secure the outgoing communication include at least one of:

causing a notification to be displayed, by the user device, that indicates that the incoming communication has a likelihood of being associated with fraud based on the risk score satisfying a first threshold of the one or more thresholds;

delaying any outgoing communications, including the outgoing communication, in response to the incoming communication to enable the system to process and analyze the outgoing communications based on the risk score satisfying a second threshold of the one or more thresholds; or blocking future incoming communications from the device based on the risk score satisfying a third threshold of the one or more thresholds.

5. The system of claim 1, wherein the one or more processors, to determine the risk score, are configured to:

continually monitor communications between the device and the user device to collect information associated with the communications; and update the risk score based on providing the information associated with the communications as an input to the machine learning model.

6. The system of claim 1, wherein at least one of the first content or the second content includes at least one of:

a particular type of content that is associated with fraud,
a voice biometric,
a value included in the incoming communication or the outgoing communication that is associated with fraud,
a word included in the incoming communication or the outgoing communication that is associated with fraud, or
a series of questions or responses included in the incoming communication or the outgoing communication that are associated with fraud.

7. A method of obfuscating communications that include sensitive information, comprising:

detecting, by a user device, a communication associated with the user device and a user;

analyzing, by the user device and using a machine learning model, a context of the communication to determine a risk score associated with the communication, wherein the risk score indicates a likelihood that the communication is associated with a fraudulent actor attempting to solicit sensitive information from the user, and wherein the risk score is based on a first content of the communication, a second content of another communication that is in response to the communication or that precedes the communication, and metadata associated with the communication or the other communication, wherein the communication and the other communication comprise a real-time audio communication;

monitoring, by the user device, the communication to identify a trigger in the communication that indicates that sensitive information is to be shared, wherein monitoring the communication includes performing one or more operations to secure the communication, and wherein the one or more operations are based on the risk score satisfying one or more thresholds;

detecting, by the user device and based on monitoring the communication, a portion of the communication that includes the sensitive information; and obfuscating, by the user device, the portion of the communication to generate an obfuscated communication by altering an audio characteristic of the real-time audio communication, wherein altering an audio characteristic comprises modifying an audio frequency to prevent unauthorized access to the sensitive information within the real-time audio communication.

8. The method of claim 7, further comprising:
transmitting the obfuscated communication.

9. The method of claim 7, wherein the one or more operations to secure the communication include at least one of:

refraining from transmitting the communication based on the risk score satisfying a first threshold, transmitting the obfuscated communication based on the risk score satisfying a second threshold, delaying a transmission of the portion of the communication until a confirmation that the portion of the communication is to be transmitted is received, inserting audio content, into an audio stream related to the real-time audio communication.

10. The method of claim 9, wherein the audio content includes a beep sample or a white noise sample.

11. The method of claim 7, further comprising:

causing a request for a confirmation that the portion of the communication is to be transmitted to be displayed by the user device, wherein the request for the confirmation indicates that the communication may be in response to a fraudulent request;

receiving a response to the request for the confirmation; and transmitting the communication based on the response indicating that the portion of the communication is to be transmitted, or refraining from transmitting the portion of the communication based on the response indicating that the portion of the communication is not to be transmitted.

12. The method of claim 7, wherein the sensitive information includes at least one of:

personally identifiable information,
a password,
an account number,
a routing number,
a transaction card number, or
security information associated with an account or a transaction card.

13. The method of claim 7, further comprising:
analyzing the communication and any preceding or subsequent communications an amount of time after transmitting the communication;
determining, based on the machine learning model, that the communication is associated with a fraudulent request for the sensitive information; and
causing a notification to be provided, to the user device, that indicates that the communication is associated with the fraudulent request for the sensitive information.

14. The method of claim 7, further comprising:
training the machine learning model based on reference communications and reference sensitive information associated with previous sensitive information provided during historical communications.

15. The method of claim 7, wherein the metadata includes a time or date associated with the real-time audio communication.

16. The method of claim 7, wherein the real-time audio communication is a phone call communication.

17. A non-transitory computer-readable medium storing a set of instructions for wireless communication, the set of instructions comprising:
one or more instructions that, when executed by one or more processors of a user device, cause the user device to:
monitor an incoming communication, from a device and to the user device, associated with a user;
determine, using a machine learning model, a risk score associated with a context of the incoming communication, wherein the risk score indicates a likelihood that the incoming communication is associated with a fraudulent request for sensitive information from the user, and wherein the risk score is based on a first content of the incoming communication, a second content of an outgoing communication that is in response to the incoming communication, wherein the incoming communication and the outgoing communication include a real-time voice call, and metadata associated with the incoming communication or the device;
monitor the outgoing communication, from the user device, for sensitive information, wherein monitoring the outgoing communication includes performing one or more operations to secure the outgoing communication, and wherein the one or more operations are based on the risk score satisfying one or more thresholds;
detect, based on monitoring the outgoing communication and using natural language processing (NLP), a portion of the outgoing communication that includes the sensitive information;
obfuscate the portion of the outgoing communication to generate an obfuscated outgoing communication by altering an audio characteristic of the real-time voice call, wherein altering the audio characteristic comprises modifying an audio frequency to prevent unauthorized access to the sensitive information within the outgoing communication; and
transmit, to the device, the obfuscated outgoing communication.

18. The non-transitory computer-readable medium of claim 17, wherein the risk score is further based on a third content of one or communications preceding the incoming communication and the outgoing communication.

19. The non-transitory computer-readable medium of claim 17, wherein the one or more instructions further cause the user device to:
cause a notification to be displayed that indicates that the incoming communication has a likelihood of being associated with fraud based on the risk score satisfying a first threshold;
delay any outgoing communications, including the outgoing communication, in response to the incoming communication to enable the user device to process and analyze the outgoing communications based on the risk score satisfying a second threshold; or
block future incoming communications from the device based on the risk score satisfying a third threshold.

20. The non-transitory computer-readable medium of claim 17, wherein the one or more instructions, that cause the user device to determine the risk score, cause the user device to:
continually monitor communications between the device and the user device to collect information associated with the communications; and
update the risk score based on providing the information associated with the communications as an input to the machine learning model.

\* \* \* \* \*